Patented Feb. 23, 1932

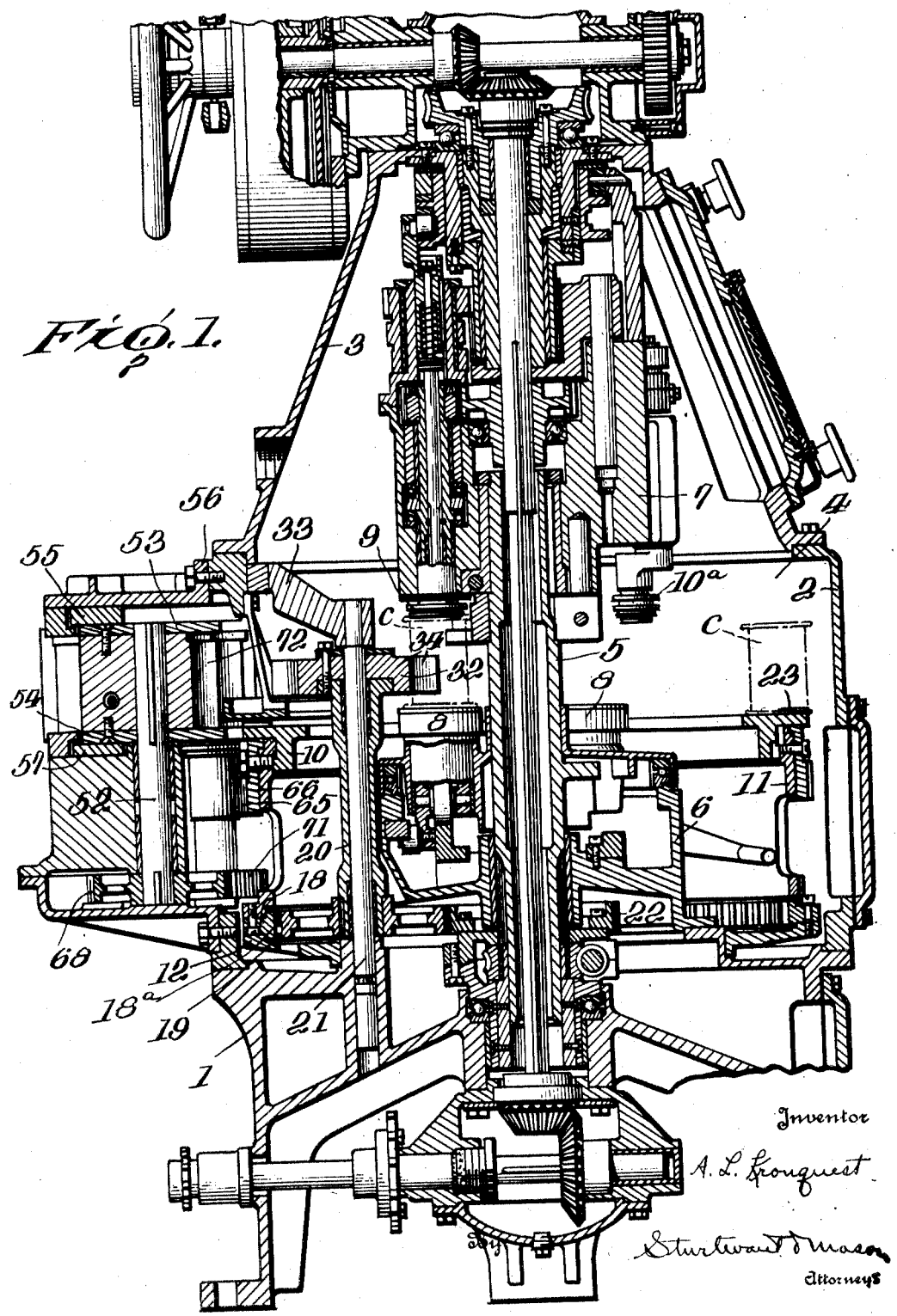

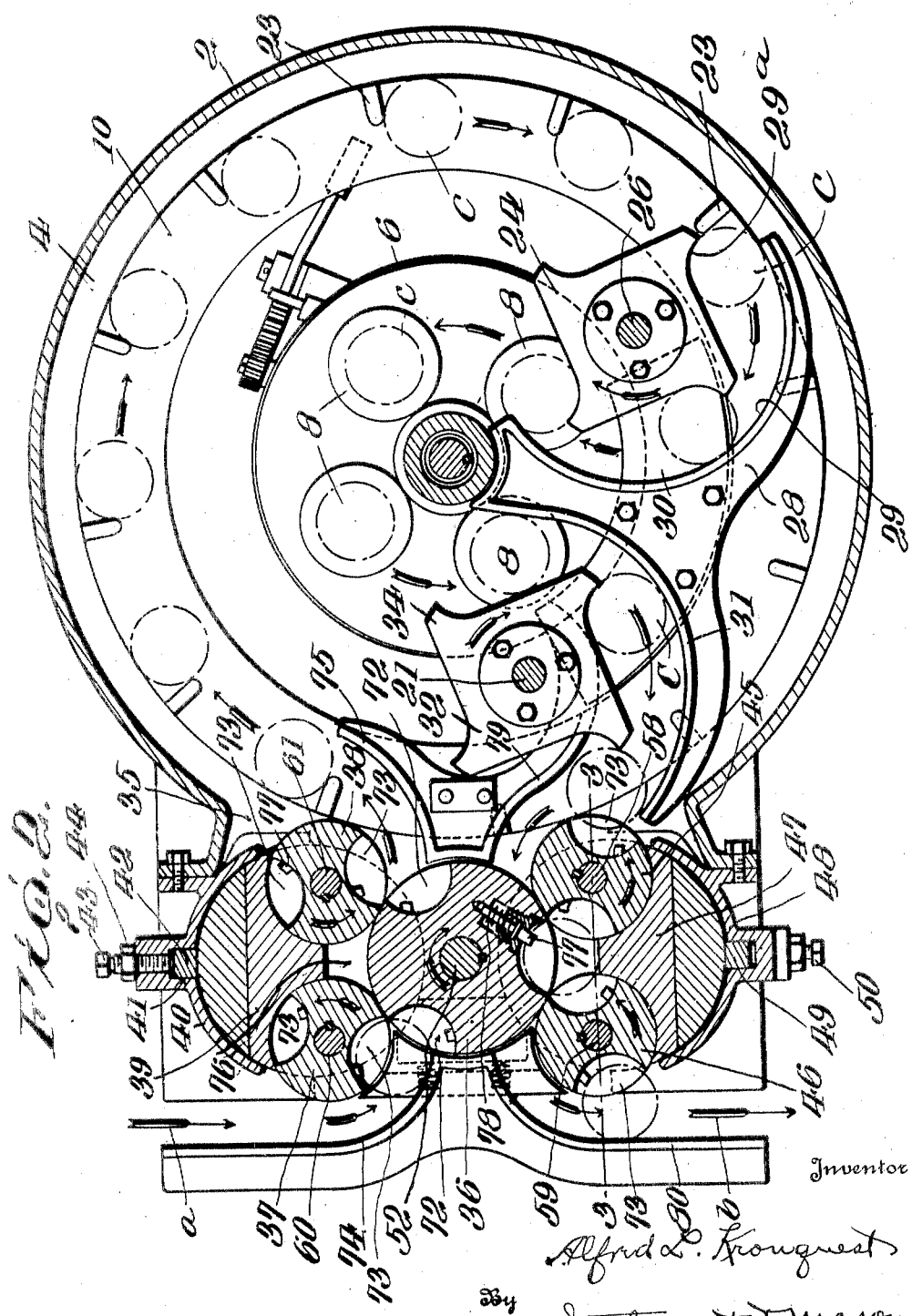

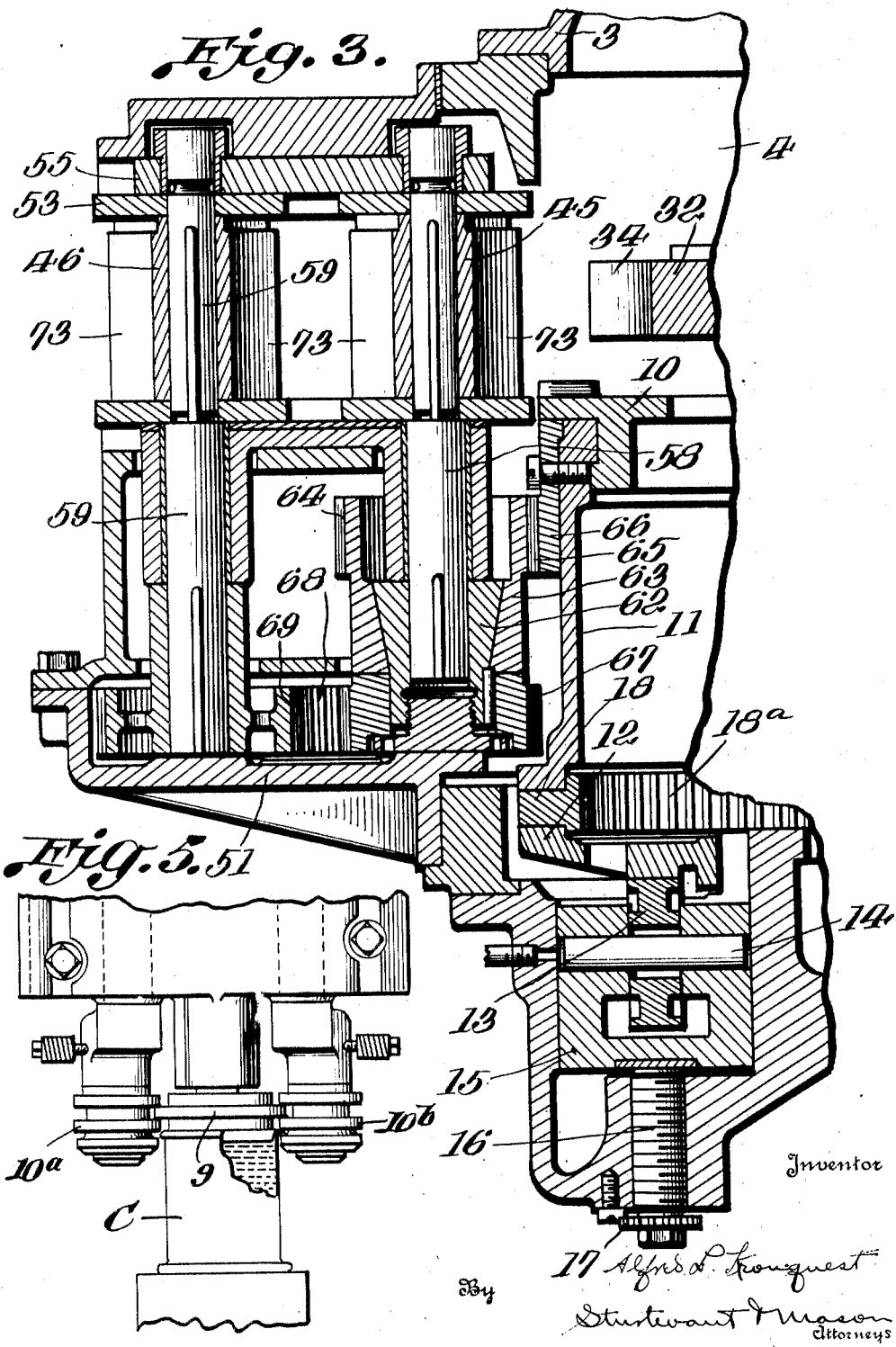

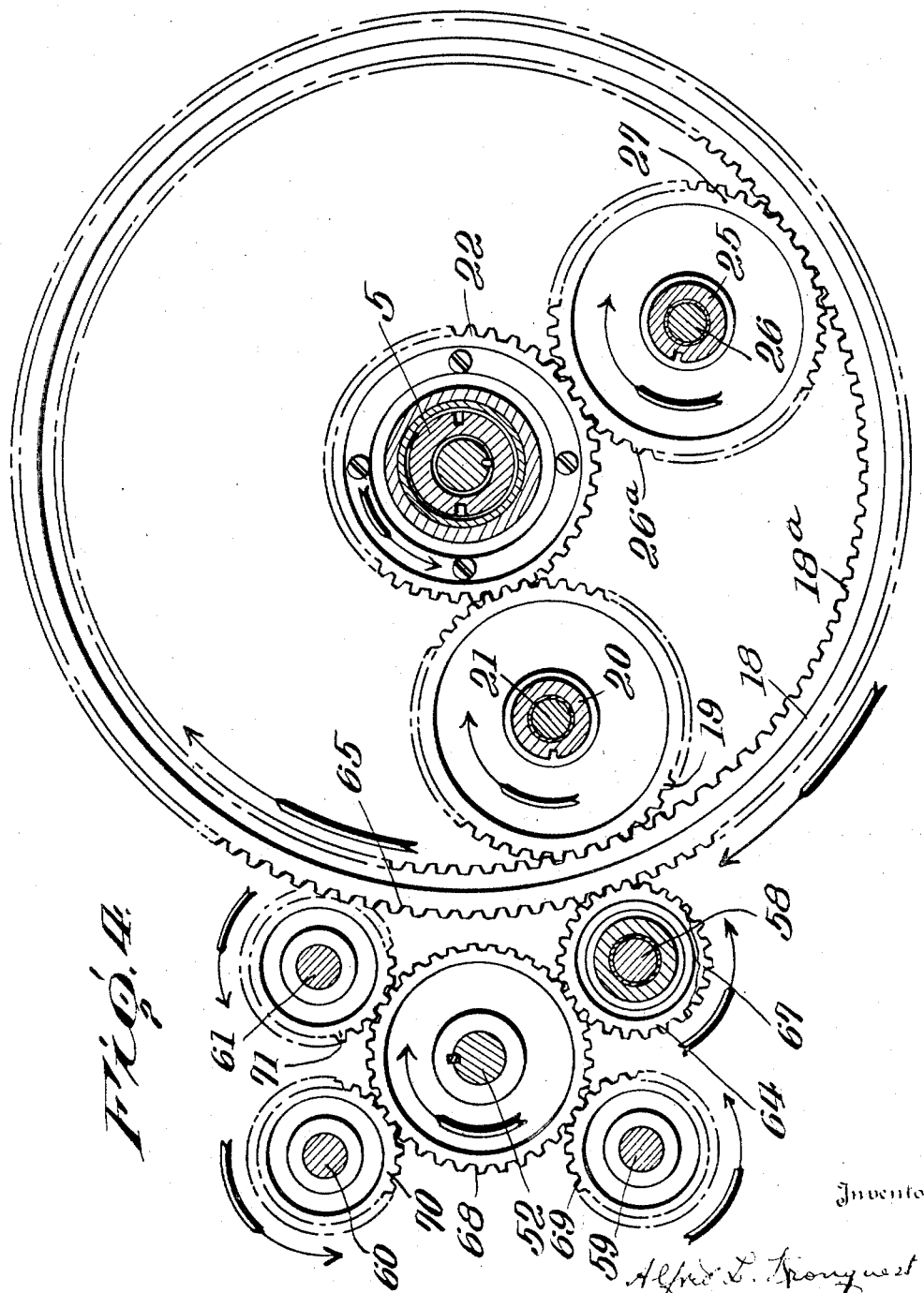

1,846,120

UNITED STATES PATENT OFFICE

ALFRED L. KRONQUEST, OF SYRACUSE, NEW YORK, ASSIGNOR TO CONTINENTAL CAN COMPANY, INC., OF NEW YORK, N. Y., A CORPORATION OF NEW YORK

CONTAINER VACUUMIZING AND SEALING MACHINE

Application filed October 31, 1928. Serial No. 316,203.

The invention relates to new and useful improvements in a container vacuumizing and sealing machine, and more particularly to a machine wherein a container to be sealed is placed in a vacuum chamber, a vacuum created therein, and the container sealed while under vacuum.

An object of the invention is to provide a machine of the above character wherein the sealing mechanism is located within a vacuumizing chamber and the containers are passed into and out of said chamber in succession without breaking the vacuum therein, and wherein the containers are received in the vacuum chamber by a continuously moving conveyor which delivers said containers to the sealing mechanism and receives the containers from the sealing mechanism after they are sealed.

A further object of the invention is to provide a machine of the above type wherein the sealing mechanism consists of a series of traveling units which receive and seal the containers while the sealing units are traveling.

A still further object of the invention is to provide a machine of the above type wherein the traveling sealing units and the conveyor rotate about a common axis and in opposite directions.

A further object of the invention is to provide a machine of the above type with a valve mechanism for passing the containers into and out of the vacuum chamber, which valve mechanism includes cooperating and moving devices containing pockets for receiving and transferring the containers into the vacuum chamber, said pockets being disposed so that the vacuum chamber is at no time open to the atmosphere through the movement of the valve.

A still further object of the invention is to provide a valve mechanism for transferring containers to a chamber without opening the chamber to the atmosphere, which valve mechanism includes a series of rotating parts having spaced pockets therein, which rotating parts are timed so as to maintain said vacuum chamber closed at all times.

These and other objects will in part be obvious and will in part be hereinafter more fully disclosed.

In the drawings which show by way of illustration one embodiment of the invention:

Fig. 1 is a vertical sectional view through a machine embodying the improvements.

Fig. 2 is a view partly in section and partly in plan showing more or less diagrammatically the construction of the valve mechanism and the arrangement of the conveyor relative to the sealing units.

Fig. 3 is a sectional view on the line 3—3 of Fig. 2.

Fig. 4 is a view partly in top plan and partly in section showing more or less diagrammatically the operating means for the conveyor, transfer devices, and the valve parts.

Fig. 5 is a view showing the lower part of one of the seaming units and a can which is being operated upon thereby.

The invention is directed broadly to a machine for vacuumizing containers and sealing the same, and consists of a main casing which is closed so that it may be placed under vacuum, thus forming a vacuum chamber into which the containers may be fed and placed under vacuum, after which the containers are sealed while in the vacuum chamber. Located within this vacuum chamber is a sealing mechanism which, as shown in the drawings, consists of a series of sealing units in the form of double seaming devices. This sealing mechanism is mounted for rotation about an axis located centrally of the casing. The sealing units are each complete so that a container may be placed in a sealing unit and sealed while the sealing mechanism is rotated. Encircling the sealing unit is a conveyor provided with a series of supporting devices for the container. Associated with this conveyor is a transfer device for receiving a container delivered thereto by the conveyor and placing the container in a sealing unit as it travels. Also associated with this conveyor is a transfer device for receiving a container from a sealing unit for transferring the container back onto the conveyor and out of the vacuum chamber.

A valve mechanism is provided for closing the opening through which the containers pass into the vacuum chamber and out of the vacuum chamber. This valve mechanism consists, as illustrated, of a central rotating member having semi-cylindrical spaced pockets therein. Associated with this central member on one side thereof are two similar smaller rotating devices cylindrical in form and having semi-cylindrical pockets. Associated with these last-named rotating devices is an adjustable wall member carried by the wall of the casing, which adjustable wall member bears against said rotating parts. On the opposite side of the central rotating member are two rotating valve members similar in construction to the one just mentioned which cooperate with the pockets in the central member and associated with these last two rotating members is an adjustable wall which makes sealing contact therewith. These rotating parts together with the adjustable wall members serve as a closing means for the opening leading to and from the vacuum chamber. The rotating parts are so timed that while one pair of associated pockets is open to receive a container and is moving the same toward or from the vacuum chamber, the other pair is operating to seal the opening, and thus it is that the containers are transferred into and out of the vacuum chamber without breaking the vacuum in said chamber.

Referring more in detail to the drawings, the machine includes a supporting frame 1 which carries a casing 2 having an upper extension 3. The casing 2 and extension 3 form a vacuum chamber 4. Located in the casing is a central column 5. Mounted on this column 5 is a lower turret 6 and also an upper turret 7. This column is rotated by a suitable dragging mechanism and the turrets rotate therewith. Mounted on these turrets is the sealing mechanism. The sealing mechanism in the present embodiment of the invention consists of a series of independent sealing units, each of which functions to perform its sealing operation during the travel of the turret. These sealing units, as shown in the drawings, are in the form of double seaming devices for joining a container end to a container body by a double seam. Each unit includes a container support 8 mounted on the lower turret and these container supports are raised and lowered in proper timing as the lower turret rotates so as to raise the container mounted thereon into engagement with the chuck on the upper turret. The upper turret chuck is indicated at 9 and the containers are indicated in broken lines at C. Associated with the chuck 9 are seaming rolls 10ª and 10ᵇ. The chuck and the seaming rolls make up the seaming unit, and there is one associated with each supporting plate 8. This portion of the machine is shown and described in detail in my Patent No. 1,752,912, granted April 1, 1930. From certain aspects of the invention, these seaming units may be of any well-known character so long as they operate to close and seal a can while the cans are moving.

The turrets carrying the sealing mechanism rotate in the direction of the arrow in Fig. 2, which is a counterclockwise direction. The turrets are considerably smaller than the casing 2 and located between the rotating turrets and the casing is a conveyor 10 which is in the form of an annulus.

This conveyor 10 is mounted on an annular supporting frame 11 which, in turn, is mounted on an annular bracket 12 supported on a series of rollers 13 mounted for free rotation on a shaft 14. This shaft 14 is, in turn, mounted on a carrier block 15 supported by a threaded post 16 mounted in the frame of the machine. This threaded post may be adjusted up and down and held in adjusted positions by suitable locking devices 17. By raising or lowering the post the blocks 15 are raised or lowered, and this will raise or lower the supporting rollers 13. There is a series of these supporting rollers and each is independently adjustable. In this way a proper supporting means is provided so that the conveyor 10 will travel in a proper plane of movement relative to the parts with which it is associated.

Located between the annular supporting frame 11 and the annular bracket 12 is an annular ring 18 which is provided on its inner face with gear teeth 18ª. These gear teeth mesh with a gear 19 mounted for rotation on a sleeve 20, which sleeve 20 is, in turn, mounted on a fixed shaft 21 (see Fig. 1). The gear 19 meshes with a gear 22 which is fixed to the column 5 and rotates therewith. As the column 5 is rotated it will impart rotation to the gear 19 and this will impart rotation to the gear ring 18 and the gear ring 18 in turn will impart rotation to the supporting frame for the annular conveyor 10. The annular conveyor 10, due to this intermediate gear, will rotate in a clockwise direction as indicated by the arrows in Fig. 2. Thus it is that the conveyor is rotated in an opposite direction from the rotation of the turrets carrying the sealing units.

The conveyor is provided with a series of radial ribs 23 against which the containers C are placed by a feeding mechanism to be described. The containers are taken from the conveyor and delivered to the sealing unit by a transfer device consisting of a rotating transfer device 24 mounted on a sleeve 25. The sleeve 25 is, in turn, mounted for rotation about a shaft 26. At the lower end of this sleeve there is a gear 27 which meshes with the gear 22 and also the gear ring 18. This gear 27 aids in the rotation of the gear ring which operates the conveyor and the sleeve 25 thus receives its movement which causes the transfer device 24 to be rotated. Mounted on a bracket plate attached to the casing 2 is a guide rail 28. This guide rail 28 has a curved face 29 which extends from a point outside of the path of travel of the radial ribs 23 on the conveyor 10 to a point adjacent the inside of the path of travel of the container support 8. The transfer device 24 is so timed that when the conveyor brings a container into range of action of the transfer device a finger 29a on the device will engage the container. This together with the traveling conveyor will cause the container to engage the curved face of the guide rail 28 and the container will be moved laterally on the conveyor and off from the conveyor onto a stationary support 30 associated with the guide rail 28. The transfer device 24 continuing its rotation will carry the container across this support and onto one of the traveling container supports 8 carried by the lower rotating turret. The guide rail 28 is provided with a second independent curved face 31. This curved face extends likewise from a point adjacent the column 5 to a point outside of the path of travel of the radial ribs on the conveyor 10.

Associated with this curved face of the guide rail 28 is a transfer device 32. The transfer device 32 is mounted on the upper end of the sleeve 20 and rotates therewith. There is a bracket arm 33 which supports the upper end of the shaft 21 and is connected thereto directly above the transfer device 32. The transfer device 32 has a series of fingers 34. These fingers are so timed that a finger will engage a container on one of the traveling supports 8 of the sealing unit and together with the movement of the support cause the container to engage the curved face 31 of the guide rail 28. Thus it is that the container is removed from the support 8 and is carried onto the stationary support 30 and across the same onto the traveling conveyor 10.

The casing 2 is provided with an opening 35 which is closed by a valve mechanism which receives the containers, delivers the same onto the conveyor 10, and which again receives the containers from the conveyor and delivers the same at a point outside of the vacuum chamber. This passing of the containers into and out of the vacuum chamber is accomplished without breaking the vacuum therein.

The valve mechanism includes a central rotating cylindrical valve section 36. Cooperating with this valve section on one side thereof are two rotating valve sections 37 and 38 which are cylindrical. Associated with the valve sections 37 and 38 is an adjustable wall member 39. The casing 2 is provided with an extension bracket 40 which is shaped to fit the adjustable wall member 39. The bracket 40 is provided with a vertical recess 41 in which is located a sealing rib member 42. This sealing member 42 bears against the adjustable wall member 39. The sealing rib makes a sufficiently tight contact with the walls of the recess and with the adjustable wall 39 so that said wall is capable of limited adjustments toward and from the valve members without breaking the seal of the vacuum chamber.

Adjusting screws 43 are provided for forcing the sealing rib into contact with the wall and for forcing the wall against the valve members. These adjusting screws are held in fixed position by lock nuts 44.

On the opposite side of the central valve member 36 there are two cooperating rotating cylindrical valve members 45 and 46 and cooperating with these valve members 45 and 46 is an adjustable wall member 47 similar to the wall member 39. This wall member 47 is mounted in a bracket 48 formed as an extension of the casing 2. A sealing rib 49 serves as a means for shifting the wall member and maintaining the seal at the side of the valve mechanism. An adjusting screw 50 is provided for pressing the sealing rib into contact with the wall member and for adjusting the wall member. Through these adjustable wall members a tight running seal may be obtained throughout the entire length of the valve members.

Extending outwardly from the frame of the machine there is a supporting bracket 51. Mounted in this supporting bracket 51 is a shaft 52 and the central valve member 36 is keyed to this shaft 52. Attached to the valve member 36 are upper and lower plates 53 and 54 respectively. The plate 53 makes a running sealing contact with a segmental plate 55 carried by a member 56 attached to the frame and bearing against said segmental plate. The plate 54 makes a running sealing contact with a segmental plate 57. Thus it is that the parts may be adjusted for providing a running seal both at the upper and lower ends of the valve parts.

The valve member 45 is mounted on a shaft 58 which is journaled in the bracket 51. The valve member 46 is mounted on a shaft 59 likewise journaled in the bracket member 51. The valve member 37 is mounted on a shaft 60 and the valve member 38 is mounted on a shaft 61. As clearly shown in Fig. 3 of the drawings, the shaft 58 is keyed to a cone sleeve 62 which, in turn, is keyed to a sleeve 63 formed with a gear 64. This gear 64 meshes with a gear 65 formed exteriorly of a sleeve 66 bolted to the frame 11 (see Fig. 3). Attached to the sleeve 63 is a gear 67. The gear 67 meshes with a gear 68 attached to the shaft 52 and the gear 68 meshes with gears 69, 70, and 71 carried respectively by the shafts 59, 60 and 61. Thus it is that the shafts supporting the rotating valve parts are all operated from this one annular gear ring carried by the rotating frame which supports the conveyor 10. In Fig. 4 of the drawings, these gears are shown and their direction of rotation is shown by the arrows. The central shaft 52 rotates in a clockwise direction while the other shafts of the valve parts rotate in a counterclockwise direction.

At each end of the rotating gear members 37, 38, 45 and 46 are sealing plates which make sealing engagement with the parts of the frame so that there is a running seal between the upper and lower ends of these valve parts and the frame, the same as the running seal between the upper and lower ends of the central valve member and the frame parts.

It is understood that the parts associated with these valve members are all attached to the casing so as to maintain a seal at the opening through which the containers are passed into and out of the vacuum chamber.

The central valve member is provided with three semi-cylindrical pockets 72. These pockets are equally spaced from each other. The valve member 37 is provided with two similar semi-cylindrical pockets 73. The valve members 38, 45 and 46 are provided with similar semi-cylindrical pockets 73. These segmental pockets are of sufficient size to house a container. The containers are fed along a suitable support by a conveyor traveling in the direction of the arrow $a$. A guide rail 74 will direct the container from the traveling conveyor into the pockets 72 and 73 of the central valve member and the outer valve member cooperating therewith. The rotation of the valve members will enclose the container in the pockets and move the container toward the vacuum chamber. The container remains in the pocket 72 and will be carried by the movement of the central valve member from the pocket 73 of the outer valve member into the pocket 73 of the inner valve member, and these valve members will deliver the container to the traveling conveyor 10. A guide rail 75 directs the containers onto the conveyor. These valve members are timed so that the containers will be placed on the conveyor directly in front of a timing radial rib. When the pockets 72 and 73 of the central valve member and the outer valve member cooperating therewith are opened to the atmosphere they are closed to a central chamber 76 between the inner and outer valve members. The inner valve member and the central valve member will make a sealing contact through the engagement of their adjacent faces and will maintain this sealing contact until the valve parts have moved so as to completely house the container in the pockets of the central valve member and the outer valve member. Thus it is that the outer valve member maintains its sealing contact with the central valve member while the container is delivered into the pocket of the inner valve member and on through into the vacuum chamber. The adjustable wall 39 is provided with semi-cylindrical walls which make sealing contact with the valve members at a point outside of the pockets formed therein. In order to facilitate the delivery of the container from the pockets. each pocket is provided with a yielding ejector 77 which is pressed by means of a spring 78 outwardly (see Fig. 2). This ejector has a very limited movement, but will assist in the moving of the container out of the pockets so that it will be under positive control by the movement of the parts of the valve. At one side of the valve mechanism as viewed in Fig. 2, there is a guide rail 79 and the containers C moved by the transfer device 32 will be guided into a pocket in the inner valve member 45 and thence through the valves in the direction of the arrows in Fig. 2 where they are delivered onto a conveyor traveling in the direction of the arrow $b$. A guide rail 80 serves to guide these containers onto this conveyor.

Inasmuch as the pockets which house the containers and carry them through into the vacuum chamber are formed in part in each of the rotating valve members, the valve members become in a large measure the active means for ejecting the containers from the pockets. Thus it is that the containers are positively forced through the valve mechanism. The containers have their ends applied thereto in any suitable way so that the end will be firmly held on the container.

It is then passed through the valve mechanism into the vacuum chamber and onto the conveyor 10. The container travels through a considerable distance before it reaches the sealing station which is located at the opposite side of the machine from where the container is received. During this extensive travel of the container before it is placed in the sealing unit, a proper vacuum can be drawn on the container. The end for closing the container may be clinched thereto in various ways, and still sufficient opportunity is given to create within the container the proper degree of vacuum before it is presented to the sealing mechanism. The container is then transferred from the conveyor after having traveled through a path in excess of 180 degrees to a sealing unit which, as noted above, may be of any desired type, but preferably of the type wherein the containers are closed while the sealing unit is traveling. This greatly increases the capacity of the machine.

It will be obvious, however, from certain aspects of the invention that this sealing unit may be of a single station type and also that the conveyor may be intermittently driven instead of moving continuously. The sealing unit travels in a direction opposite to that of the conveyor, and therefore, the container may be moved through the arc of a circle in excess of 180 degrees while it is in the sealing unit. This gives ample time for the closing of the sealing unit even by first and second double seaming operations and without unduly increasing the size of the machine.

It is obvious that minor changes in the arrangement of the parts and in the details of construction may be made without departing from the spirit of the invention as set forth in the appended claims.

Having fully described my invention, what I claim as new and desire to secure by Letters Patent, is:—

1. The combination of a container sealing mechanism, a casing forming a vacuum chamber in which the sealing mechanism is located, a conveyor located in said vacuum chamber and encircling said sealing mechanism, a transfer device for transferring the containers from the conveyor to the sealing mechanism, a transfer device for transferring the containers from the sealing mechanism after they are closed to the conveyor, and a valve mechanism through which the containers are delivered into and removed from the vacuum chamber.

2. The combination of a container sealing mechanism, a casing forming a vacuum chamber in which the sealing mechanism is located, a valve mechanism through which the containers are delivered into and removed from the vacuum chamber, a conveyor located in said vacuum chamber and encircling said sealing mechanism, a transfer device disposed at a point remote from the valve mechanism for transferring containers from the conveyor to the sealing mechanism, and a transfer device for receiving the container from the sealing mechanism after it is closed for transferring the same to the conveyor.

3. The combination of a casing forming a vacuum chamber, a series of container sealing units located in said chamber and rotating bodily about a vertical axis, a conveyor located in said vacuum chamber and encircling said sealing units and rotating in the opposite direction about said axis, a valve mechanism through which the containers are delivered into and removed from said chamber, a transfer device for transferring the containers from the conveyor to the sealing mechanism, and a transfer device for transferring the containers from the sealing mechanism to the conveyor.

4. The combination of a casing forming a vacuum chamber, a series of double seaming units for closing the containers disposed in said chamber and rotating bodily about a vertical axis, a conveyor located in said vacuum chamber and rotating about the same axis outside of the double seaming units and in an opposite direction, a transfer device for transferring the containers from the conveyor to the double seaming units and a transfer device for transferring the containers from the double seaming units to the conveyor.

5. The combination of a casing forming a vacuum chamber, a plurality of double seaming units located in said vacuum chamber and rotating about a vertical axis centrally of the chamber, a conveyor encircling said double seaming units and rotating about said axis in the opposite direction to the rotation of the seaming units, said conveyor having a series of radial ribs for positioning the containers on the conveyor, a transfer device and associated guide for transferring a container from the conveyor to a seaming unit, a transfer device and associated guide for removing the container from the seaming unit, and a valve mechanism through which the containers are delivered into and removed from the vacuum chamber.

6. The combination of a casing forming a vacuum chamber, a series of seaming units disposed within said vacuum chamber and rotating bodily about a vertical axis centrally thereof, a conveyor encircling said seaming units and rotating about said axis in a direction opposite to the direction of rotation of the seaming units, a valve mechanism through which the containers are delivered into the vacuum chamber and removed therefrom, said conveyor having a series of radial ribs for positioning the containers thereon, a transfer device disposed at a point removed more than 180 degrees from the valve mechanism for transferring a container from the conveyor to the seaming unit and a transfer device adjacent the valve mechanism for removing a container from the seaming unit.

7. The combination of a casing forming a vacuum chamber, a container sealing mechanism located therein, a conveyor located in said vacuum chamber and encircling said sealing mechanism, a valve mechanism including cooperating rotating devices for delivering a container into the vacuum chamber and onto said conveyor, a transfer device located at a point removed from the valve mechanism for transferring a container from the conveyor to the sealing mechanism, and a transfer device for removing the container from the sealing mechanism, after it is closed, onto said conveyor, said valve mechanism also including rotating parts for receiving the containers delivered thereto from the conveyor for removing the containers from the vacuum chamber.

8. The combination of a casing forming a vacuum chamber, a series of seaming units located within said chamber and rotating bodily continuously about a vertical axis, a conveyor located within said vacuum chamber and rotating continuously about said axis in a direction opposite the rotation of the seaming units, a valve mechanism including rotating valve parts for delivering the containers to the conveyor and for receiving the containers from the conveyor and moving the same from the vacuum chamber, a transfer device for transferring the containers from the conveyor to the seaming unit, and a transfer device for removing the containers from the seaming units onto the conveyor.

9. The combination of a casing forming a vacuum chamber, an upper and lower turret located within said vacuum chamber and rotating about a vertical axis, seaming units mounted on and traveling with said turrets, a conveyor encircling said turrets and mounted on said casing independently thereof, a driving mechanism for rotating said conveyor in a direction opposite to the rotation of the turrets, a transfer device for transferring containers from said conveyor to a seaming unit, a transfer device for transferring a container from the seaming unit to the conveyor, after it is closed, and a valve mechanism through which the containers are delivered to and removed from said vacuum chamber.

10. The combination of a casing forming a vacuum chamber, upper and lower turrets disposed in said vacuum chamber and rotated about a vertical axis, a plurality of seaming units mounted on said turrets, a conveyor encircling said turrets, means carried by the casing for supporting said conveyor whereby it may be rotated in a direction opposite to the turrets, a driving mechanism for rotating the turrets and for rotating the conveyor, a transfer device for transferring the containers from the conveyor in succession to the seaming units, a transfer for removing the containers from the seaming units onto the conveyor, and a valve mechanism through which the containers are delivered to and removed from the vacuum chamber.

11. The combination of a casing forming a vacuum chamber, a container sealing mechanism located therein, a conveyor located in said vacuum chamber and encircling said sealing mechanism, means for rotating the sealing mechanism bodily about a vertical axis, means for rotating the conveyor in an opposite direction about said axis, devices for transferring the containers from the conveyor to the sealing mechanism and from the sealing mechanism to the conveyor, a valve mechanism through which the containers are delivered to and removed from the vacuum chamber, means for supporting the conveyor including a series of rollers and independent devices for supporting the rollers whereby they may be adjusted for leveling the conveyor.

12. The combination of a casing forming a vacuum chamber, a container sealing mechanism located therein, a conveyor located in said vacuum chamber and encircling said sealing mechanism, means for rotating the sealing mechanism bodily about a vertical axis, means for rotating the conveyor in an opposite direction about said axis, devices for transferring the containers from the conveyor to the sealing mechanism and from the sealing mechanism to the conveyor, a valve mechanism through which the containers are delivered to and removed from the vacuum chamber, said valve mechanism including a series of rotatable parts and means whereby said parts are rotated from the conveyor.

13. The combination of a casing forming a vacuum chamber, sealing devices located in said vacuum chamber, and a valve mechanism through which the containers are delivered to and removed from the vacuum chamber, said valve mechanism including a plurality of cylindrical members having fluid-tight running contact, said members having pairs of semi-cylindrical pockets for housing and transferring the containers through the valve mechanism, said cylindrical members being so disposed that a container passes first into and through one pair of pockets and then another pair of pockets at spaced intervals and without opening the vacuum chamber to the atmosphere.

14. The combination of a casing forming a vacuum chamber, sealing devices located in said vacuum chamber, a valve mechanism through which the containers are delivered to and removed from the vacuum chamber, said valve mechanism including two cylindrical members having semi-cylindrical pockets and a cooperating cylindrical member making fluid-tight running contact with both of said first-named members and having semi-cylindrical pockets therein cooperating with the pockets in said first-named members for housing and transferring containers through the valve mechanism, said cylindrical members being so disposed that a container passes first into and through one pair of pockets and then another pair of pockets at spaced intervals without opening the vacuum chamber to the atmosphere.

15. The combination of a casing forming a vacuum chamber, sealing devices located in said vacuum chamber, a valve mechanism through which the containers are delivered to and removed from the vacuum chamber, said valve mechanism including a central cylindrical member having a series of semi-cylindrical pockets, a pair of cylindrical members at one side of said central member having fluid-tight running contact with said central member, semi-cylindrical pockets cooperating in succession with the pockets in the central member for housing and transferring a container, said pair of cylindrical members being disposed so as to receive the containers in succession and at spaced intervals whereby one of said pairs of members makes fluid-tight running contact with said central member at all times.

16. The combination of a casing forming a vacuum chamber, sealing devices located in said vacuum chamber, a valve mechanism through which the containers are delivered to and removed from the vacuum chamber, said valve mechanism including a central cylindrical member having a series of semi-cylindrical pockets, a pair of cylindrical members at one side of said central member having fluid-tight running contact with said central member, semi-cylindrical pockets cooperating in succession with the pockets in the central member for housing and transferring a container, said pair of cylindrical members being disposed so as to receive the containers in succession and at spaced intervals whereby one of said pairs of members makes fluid-tight running contact with said central member at all times, and another pair of similarly constructed cylindrical members having semi-cylindrical pockets for removing the containers from the vacuum chamber.

17. The combination of a casing forming a vacuum chamber, sealing devices located in said vacuum chamber, a valve mechanism through which the containers are delivered to and removed from the vacuum chamber, said valve mechanism including a central cylindrical member having a series of semi-cylindrical pockets, a pair of cylindrical members at one side of said central member having fluid-tight running contact with said central member, semi-cylindrical pockets cooperating in succession with the pockets in the central member for housing and transferring a container, said pair of cylindrical members being disposed so as to receive the containers in succession and at spaced intervals whereby one of said pairs of members makes fluid-tight running contact with said central member at all times, said casing having an adjustable wall member provided with curved faces making fluid-tight running contact with said pair of cylindrical valve members.

18. The combination of a casing forming a vacuum chamber, sealing devices located in said vacuum chamber, a valve mechanism through which the containers are delivered to and removed from the vacuum chamber, said valve mechanism including a central cylindrical member having a series of semi-cylindrical pockets, a pair of cylindrical members at one side of said central member having fluid-tight running contact with said central member, semi-cylindrical pockets cooperating in succession with the pockets in the central member for housing and transferring a container, said pair of cylindrical members being disposed so as to receive the containers in succession and at spaced intervals whereby one of said pairs of members makes fluid-tight running contact with said central member at all times, said casing having an adjustable wall member provided with curved faces making fluid-tight running contact with said pair of cylindrical valve members, a sealing rib engaging said adjustable wall member, and adjusting screws for engaging said rib for maintaining said rib in sealing contact with the adjustable wall member and the adjustable wall member in sealing contact with the valve member.

19. The combination of a casing forming a vacuum chamber, sealing devices located in said vacuum chamber, and a valve mechanism through which the containers are delivered to and removed from the vacuum chamber, said valve mechanism including a central cylindrical member, pairs of cooperating cylindrical valve members making fluid-tight running contact therewith, and adjustable wall members having sealing contact with said respective pairs of valve members, said cylindrical valve members having pockets formed therein adapted to receive and transfer the containers through the valve mechanism, said pockets being disposed so that one of each pair of valve members makes continuous sealing contact with said central member.

20. The combination of a casing forming a vacuum chamber, sealing devices located in said vacuum chamber, and a valve mechanism through which the containers are delivered to and removed from the vacuum chamber, said valve mechanism including a central cylindrical member, pairs of cooperating cylindrical valve members making fluid-tight running contact therewith, adjustable wall members having sealing contact with said respective pairs of valve members, said cylindrical valve members having pockets formed therein adapted to receive and transfer the containers through the valve mechanism, said pockets being disposed so that one of each pair of valve members makes continous sealing contact with said central member, and devices carried by said cylindrical valve members for aiding in ejecting the containers from said pockets.

In testimony whereof, I affix my signature.

ALFRED L. KRONQUEST.